(12) United States Patent
Svihla et al.

(10) Patent No.: US 6,354,815 B1
(45) Date of Patent: Mar. 12, 2002

(54) TURBOCHARGER THERMAL ISOLATION CONNECTION

(75) Inventors: Gary R Svihla, Clarendon Hills; Charles Henry Mc Creary, Oak Park; John R. Zagone, Westmont, all of IL (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/567,882

(22) Filed: May 10, 2000

(51) Int. Cl.[7] .......................... F04B 17/00; F04B 35/00
(52) U.S. Cl. ...................................... 417/407
(58) Field of Search .................. 417/373, 409, 417/407, 406; 415/135, 136, 204, 206

(56) References Cited

U.S. PATENT DOCUMENTS 3,778,194 A * 12/1973 Miller et al. ................ 417/407
5,549,449 A * 8/1996 McInerney et al. ......... 415/177
6,017,184 A * 1/2000 Aguillar et al. ............. 415/112
6,062,028 A * 5/2000 Arnold et al. ................ 60/612

\* cited by examiner

Primary Examiner—Timothy S. Thorpe
Assistant Examiner—William H Rodriguez
(74) Attorney, Agent, or Firm—Cary W. Brooks

(57) ABSTRACT

An engine turbocharger includes a thermal isolation connection between a rotor and compressor section support and an exhaust section including an exhaust duct attached to the rotor support. The connection includes spring biased wear pads allowing sliding motion at one or more interfaces between the exhaust duct and the rotor support to accommodate relative radial thermal growth. Radial key and slot guides between the exhaust duct and rotor support maintain axial alignment of the connected components during relative radial motion at the connecting interfaces.

12 Claims, 3 Drawing Sheets

TURBOCHARGER THERMAL ISOLATION CONNECTION

TECHNICAL FIELD

This invention relates to engine exhaust driven turbochargers and, more particularly, to a turbocharger with connecting means that align, affix and thermally isolate stationary exhaust turbine section components from an adjoining support structure containing the rotor system and stationary compressor section components.

BACKGROUND OF THE INVENTION

Continuing development of turbochargers is directed toward increasing efficiency over a greater range of operation at higher pressure ratios in smaller and more reliable configurations to improve engine fuel efficiency, reduce environmentally harmful exhaust emissions and minimize product cost. Improved turbocharger designs must endure significant cyclical thermal gradients between stationary turbine exhaust components and the rotor support structure. The turbine exhaust components include the stationary ducts used to convey engine exhaust gas through the turbine section to extract useful work and shroud the turbine section rotating components, thereby requiring concentric alignment. The rotor system comprises a rotor on which one or more compressors arranged for radial or axial air output are mounted in a coaxial arrangement with one or more turbines configured for radial or axial exhaust gas input. The rotor system is supported on two or more bearings either inboard or outboard of these mechanisms. Stationary compressor components mount to the rotor support and channel compressed inlet air away from the turbocharger. The need to utilize maximum exhaust energy available to the turbine section tends to conflict with the need to maintain rotor support bearings and compressed intake air at much lower relative temperatures. Improved means for aligning and thermally isolating the connected high and low temperature components are accordingly desired.

SUMMARY OF THE INVENTION

The present invention provides a turbocharger connection structure that thermally isolates stationary turbine components from a rotor support structure by minimizing contact between the two assemblies while maintaining concentric alignment of the rotor with the respect to the adjoining turbine components. In operation, the significantly hotter turbine components, such as the turbine exhaust duct, expand radially beyond the supporting rotor support dimensions by sliding about an array of fixed or replaceable pads that minimize heat transfer across the interface. Spring assemblies at each pad location moderate the clamp load against each pad to permit sliding across the joint without undue wear. A guide aligns each spring assembly and controls clamping force by limiting spring compression. As the pads wear, clamping force decreases very little due to minimal change in the spring force relative to deflection. The clamping force remains sufficient to keep the interface together, thereby maintaining a continuous constraint normal to the plane of the interface.

A minimum of three fixed or floating machined guides, comprising radially arrayed keys engaging mating slots in the connected members, constrain translational or rotational movement within clearances designed into the guides. Adjoining components, each containing half of the guide system, move relative to each other without losing rotor centerline alignment. This system of radial guides provides the sole means of alignment and support about the interface plane with no need for pilots or other alignment aids. The unique interface provided by the invention accomplishes the primary goals of turbine section alignment and joint durability while significantly impeding heat migration into the rotor support structure.

These and other features and advantages of the invention will be more fully understood from the following description of certain specific embodiments of the invention taken together with the accompanying drawings.

DESCRIPTION OF THE PREFERRED EMBODIMENT

Figure 1:
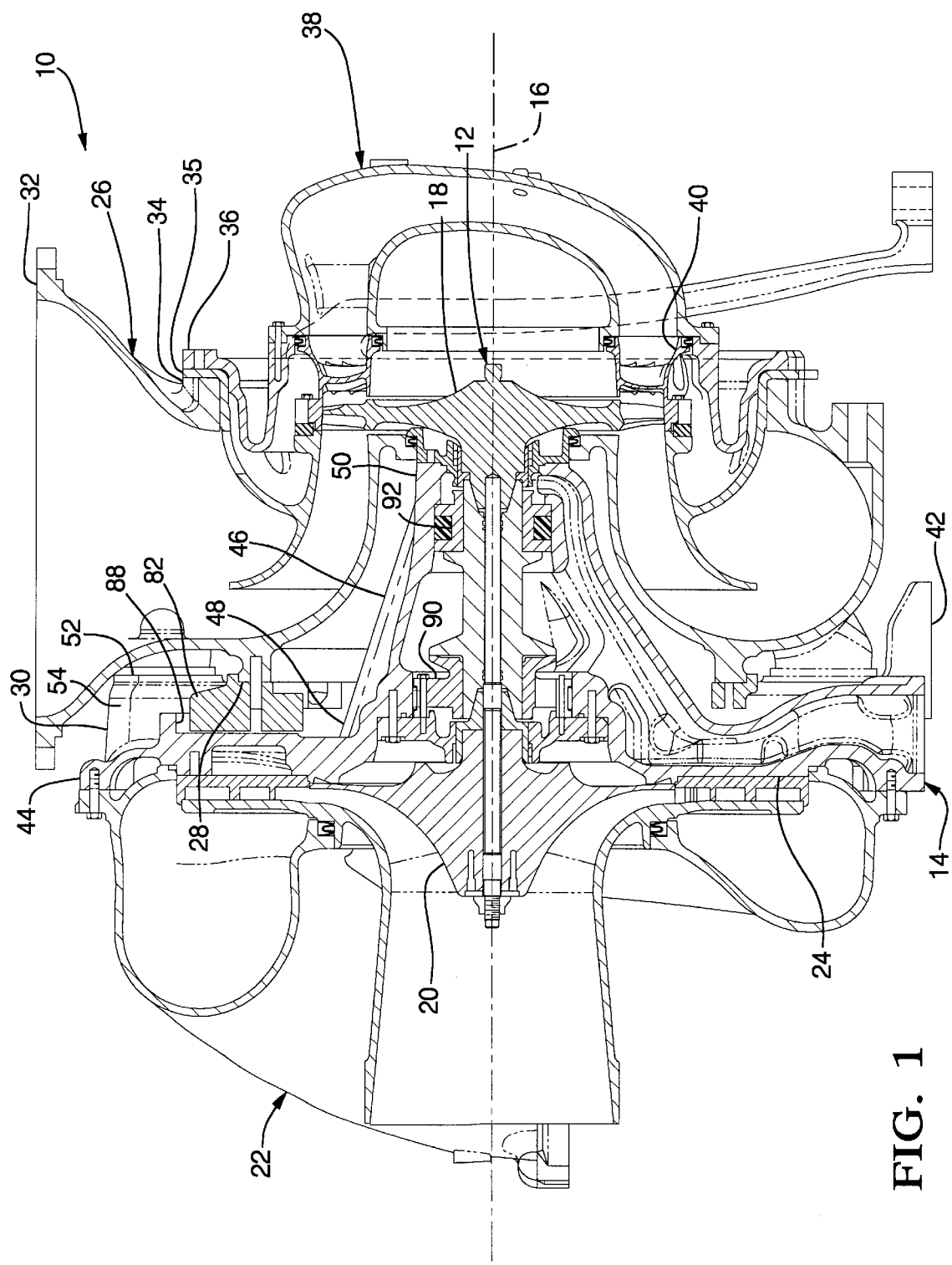
FIG. 1 is a cross-sectional view of an engine turbocharger having a thermal isolation connection in accordance with the invention.
Figure 2:
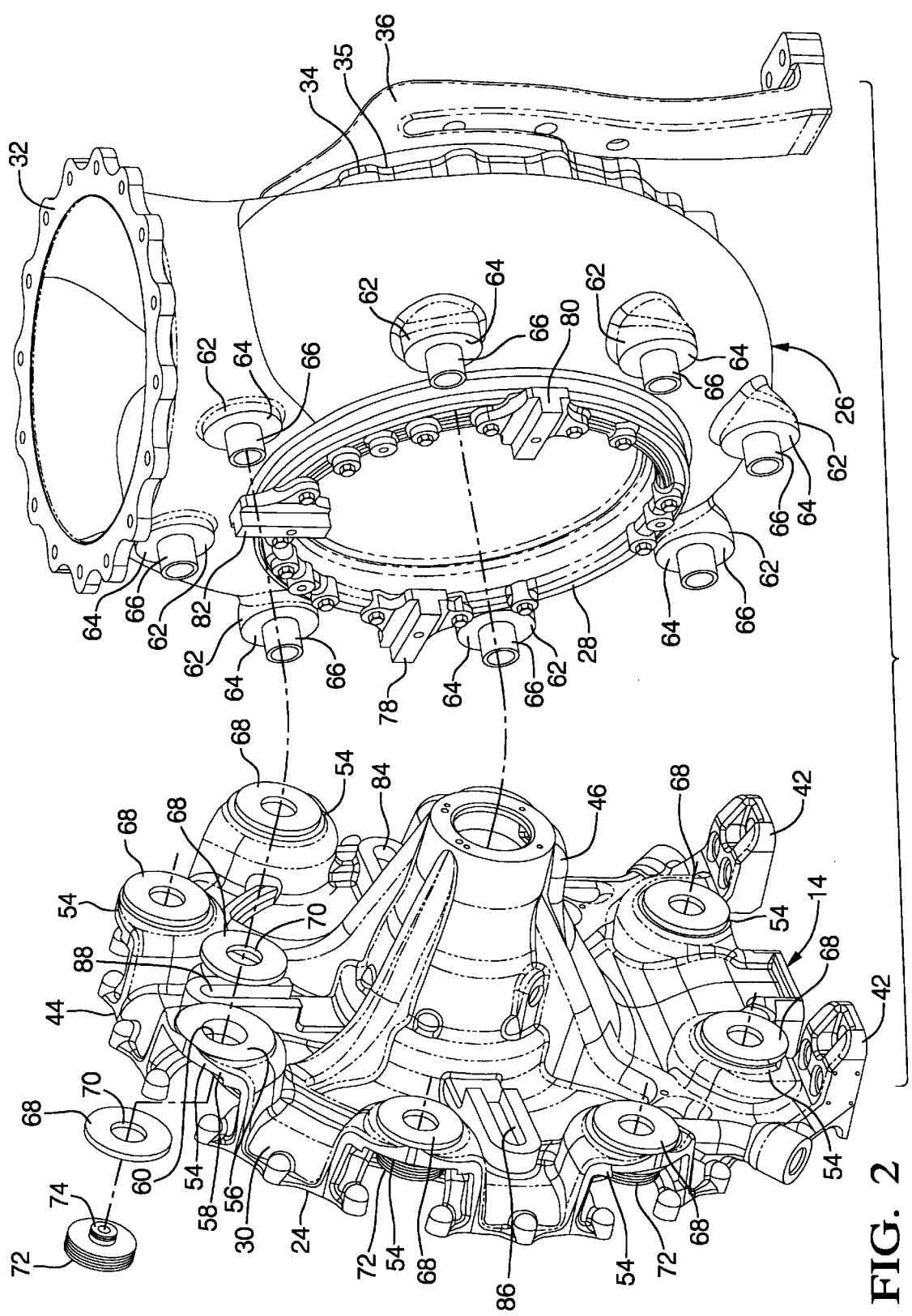
FIG. 2 is a partially exploded pictorial view showing the isolation connections and radial guides acting between the rotor support and exhaust duct components of the embodiment of FIG. 1.

Referring now to the drawings in detail numeral 10 generally indicates an exhaust driven turbocharger for an engine, such as a diesel engine intended for use in railway locomotives or other applications of medium speed diesel engines. Turbocharger 10 includes a rotor 12 carried by a rotor support 14 for rotation on a longitudinal axis 16 and including a turbine wheel 18 and a compressor wheel 20. The compressor wheel is enclosed by a compressor housing assembly 22 including components which are supported on an axial first side 24 of the rotor support 14. An exhaust duct 26 has a compressor end 28 that is mounted on a second side 30 of the rotor support 14 spaced axially from the first side 24.

The exhaust duct 26 is physically positioned between the rotor support 14 and the turbine wheel 18 to receive exhaust gases passing through the turbine wheel and carry them to an exhaust outlet 32. A turbine end 34 of the exhaust duct 26 and an associated nozzle retainer assembly 35 are separately supported by an exhaust duct support 36 that is connected with the exhaust duct 26 and retainer 35 at the turbine end 34. The exhaust duct support 36 also supports a turbine inlet scroll 38 which receives exhaust gas from the associated engine and directs it through a nozzle ring 40 to the turbine wheel 18 for transferring energy to drive the turbocharger compressor wheel 20.

The rotor support 14 includes a pair of laterally spaced mounting feet 42 which are rigidly connected to an upstanding mounting portion 44 of the rotor support 14 and are adapted to be fixedly mounted on a rigid base, not shown. The rotor support 14 further includes a tapering rotor support portion 46 that carries the rotor 12 for rotation on the axis 16. The rotor is carried with the compressor wheel 20 disposed on the first side 24 of the rotor support, adjacent a first axial end 48 of the rotor support portion, while the turbine wheel is disposed for rotation at an opposite second end 50 of the rotor support portion.

Figure 3:
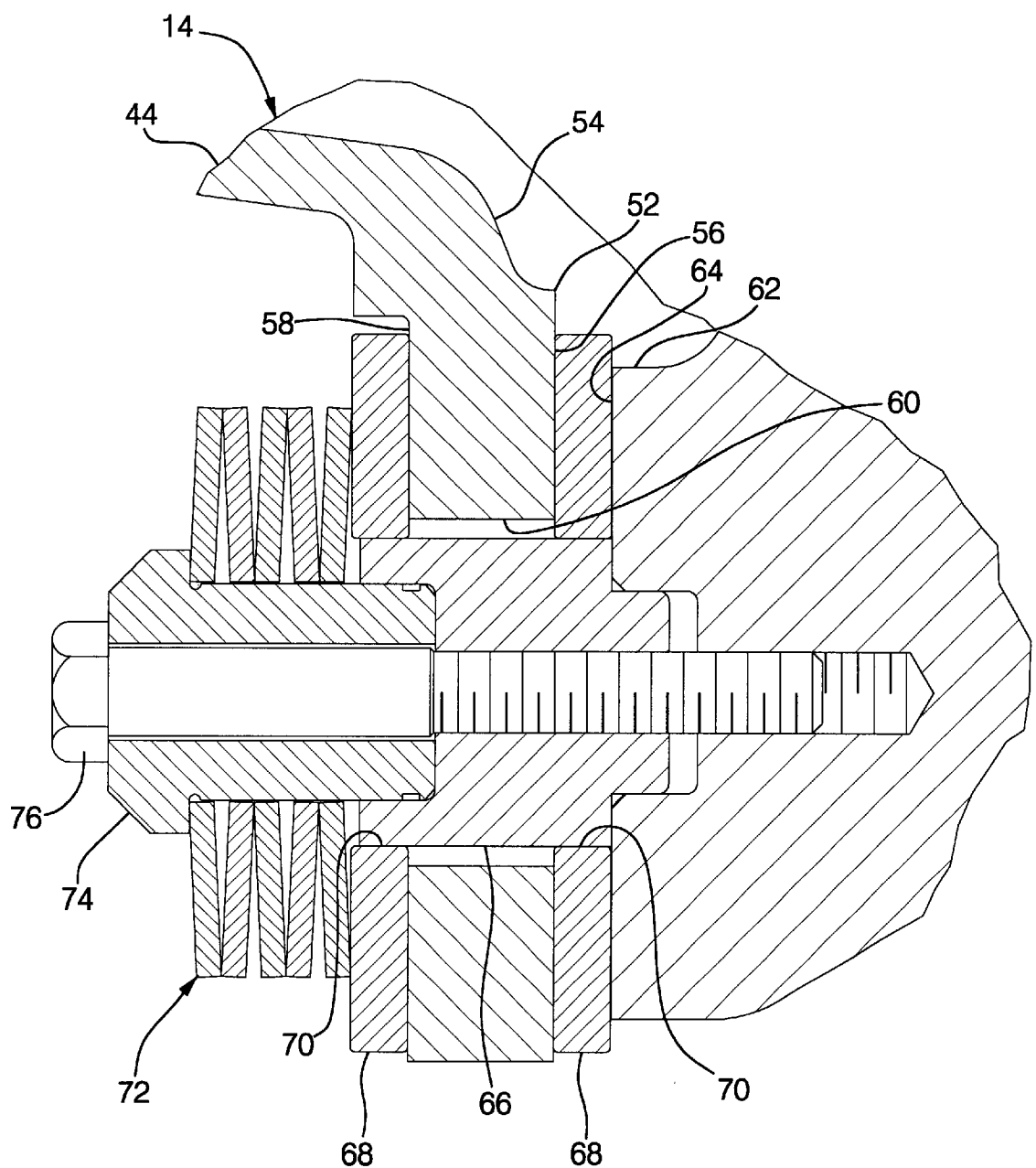
FIG. 3 is an enlarged cross-sectional view through one of the spring loaded pad assemblies securing the rotor support and exhaust duct together and providing thermal isolation while allowing relative radial expansion.

In accordance with the invention, the exhaust duct 26 is connected with the mounting portion 44 of the rotor support 14 at an interface 52 defined by a plurality of annularly spaced mounts 54 which are preferably, though not necessarily, aligned in a plane defined by the interface. The mounts 54 have axially opposite first and second bearing faces 56, 58 (FIG. 3) connected by central clearance openings 60. The exhaust duct includes mating axially spaced connecting mounts 62 which include opposing faces 64 that, in assembly, face the first bearing faces 56 of the spaced mounts 54.

Preferably, cylindrical central guides 66, which may comprise separate members, extend outward from the opposing faces 64 of the connecting mounts into the clearance openings 60 of the spaced mounts 54. Wear pads 68, preferably comprising metal washers such as steel, are positioned on both first and second bearing faces of the mounting portion spaced mounts 54 and are axially aligned by the central guides 66 which pass through similarly sized openings 70 of the washers 68. A first group of washers 68 are positioned between the first bearing faces 56 of the spaced mounts and the opposing faces 64 of the connecting mounts. A supplemental group of washers 68 engage the second bearing faces 58 of the spaced mounts.

The wear pads 68 are held in controlled frictional engagement with the various faces by spring packs 72, each formed of stacked spring washers aligned by a bushing-like guide 74 and compressed by a screw 76 that extends through the guides 74 and 66 into threaded engagement with the exhaust duct 26. The screws 76 compress the spring packs 72 until the guides 74 engage the central guides 66 to limit the amount of compression and generate a desired force. The force provided is adequate to maintain the components in assembly at all times but to allow relative sliding motion between the rotor support mounting portion 44 and the exhaust duct 26 without causing excessive wear of the wear pads 68.

In order to maintain axial alignment of the exhaust duct 26 with the rotor support 14 and the rotor elements attached thereto, the rotor support 14 and exhaust duct 26 are provided with radial slot and key guide means allowing radial expansion of the exhaust duct 26 relative to the rotor support 14 which is maintained at a lower temperature. The slot and key means could be arranged with the elements on either of the members but, in the present instance, include three radially oriented keys 78, 80, 82 protruding from the compressor side 28 of the exhaust duct and received in three radially oriented slots 84, 86, 88 provided on the mounting portion 44 of the rotor support 14. In the illustrated embodiment, keys 78, 80 engage slots 84, 86 which are aligned on a horizontal plane, not shown, intersecting the longitudinal axis 16 of the rotor 12. The additional key 82 engages slot 88, both of which are positioned in a vertical plane, not shown, intersecting the longitudinal axis 16 of the rotor. A minimum of three keys connecting with three slots, all being radially directed, are required for properly aligning the connecting components while allowing relative thermal growth. The keys not need be aligned in horizontal and vertical planes, as long as they are positioned radially and in a manner to fix the axial alignment of the connecting parts.

The turbocharger rotor 12 is supported by pressure oil lubricated bearings 90, 92, which it is necessary to maintain at an operating temperature considerably lower than that reached by the exhaust duct due to the passage of high temperature exhaust gases therethrough. This lower temperature is maintained in part by a flow of pressure oil or lubricant through rotor support portion 46 to the bearings 90, 92. However, a major part of the lower temperature is provided by the isolating structure and operation of the present invention.

In operation, the turbocharger rotor support 14 and the connected exhaust duct 26 are maintained in axial alignment by the key and slot guide means previously described. As the turbocharger heats up from the cold condition to differing temperatures in the exhaust and inlet passages during operation, the exhaust duct 32 expands radially relative to the connected rotor support 14. During this expansion, axial alignment of the parts continues to be maintained by radial sliding of the keys 78, 80, 82 in their respective slots 84, 86, 88 in the rotor support. The radial expansion is allowed by the controlled forces exerted by the spring packs 72 acting on the wear pads 68 between the connecting surfaces of the rotor support 14 and the exhaust duct 26. The controlled forces are such as to allow sliding of the surfaces relative to one another with wear taken up by the wear pads 68. Since the wear is relatively slight over a long period of time, the force of the spring packs is not significantly changed. Thus the controlled force remains essentially constant and is always sufficient to maintain the associated components in solid contact with one another while continuing to allow expansion and contraction of the exhaust duct relative to the rotor support and to maintain axial alignment of these components during all operating conditions.

At the same time, the steel washer wear pads 68 provide double interfaces connecting the high temperature exhaust duct with the lower temperature rotor support portion 46. These interfaces allow relative sliding of the contacting surfaces and also impede the transfer of heat to provide significant thermal isolation of the rotor support from the higher temperatures in the exhaust duct. The key and slot radial guide means with then sliding surfaces also contribute to the thermal isolation of the components.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A turbocharger having a rotor with an exhaust driven turbine wheel drivingly connected with an intake charge compressor wheel rotatable on a common axis, said turbocharger comprising:

a support including an upstanding mounting portion adapted to be secured to a base and a tapering rotor support portion rotatably supporting the rotor on the axis with the compressor wheel disposed on a first axial end of the support portion and the turbine wheel disposed on an opposite second end of the support portion;

an exhaust duct for conducting exhaust gas passing from the turbine wheel to an exhaust outlet, the support mounting portion connected with the exhaust duct at an interface;

a plurality of spaced mounts provided at said interface on the support mounting portion, the mounts having axially opposite faces;

connecting mounts on the exhaust duct and including opposing faces;

wear pads between and engaging faces of the spaced mounts and the opposing faces of the connecting mounts; and resilient means urging the spaced mounts and connecting mounts together with a force adequate to retain the support and the exhaust duct in assembly but limited to allow sliding motion of the wear pads on the opposing faces of the connecting mounts and the spaced mounts;

the wear pads limiting heat transfer from the exhaust duct to the support to prevent high exhaust gas temperatures in the exhaust duct from causing excessive rotor operating temperatures in the support.

2. A turbocharger as in claim 1 including supplemental wear pads between the resilient means and the faces of the connecting mounts opposite from those faces engaging the first named wear pads, the supplemental wear pads acting to further limit heat transfer to the support means.

3. A turbocharger as in claim 2 including centrally disposed clearance openings in the spaced mounts and central guides projecting from the opposing faces of the connecting mounts and extending through the clearance openings of the spaced mounts, the guides aligning the wear pads with the connecting mounts and allowing sliding of the wear pads on the opposite surfaces of the spaced mounts.

4. A turbocharger as in claim 3 wherein said central guides are cylindrical and said wear pads comprise flat washers with openings receiving the guides.

5. A turbocharger as in claim 4 wherein said resilient means comprise a spring pack of spring washers.

6. A turbocharger as in claim 1 including radial slot and key means between the support and the exhaust duct and the allowing radial expansion and contraction of the exhaust duct relative to the support while maintaining the support and exhaust duct in axial alignment.

7. A turbocharger as in claim 6 wherein said slot and key means include at least three axially protruding keys mounted on said exhaust duct and aligned in at least two different radial planes, and at least three axially recessed slots in said support aligned in the same radial planes and mating with said keys.

8. A turbocharger as in claim 1 wherein said rotor support portion of the support carries bearings supporting the rotor, the bearings being provided with pressure lubrication which provides cooling that assists in maintaining a reduced operating temperature in the rotor support portion.

9. A turbocharger as in claim 1 wherein said support additionally carries compressor air inlet and outlet means for conducting air to and away from the compressor wheel.

10. A turbocharger having a rotor with an exhaust driven turbine wheel drivingly connected with an intake charge compressor wheel rotatable on a common axis, said turbocharger comprising:

support means rotatably supporting the rotor on the axis with the compressor wheel disposed on a first axial end of the support and the turbine wheel disposed on an opposite second end of the support;

exhaust means for conducting exhaust gas passing through the turbine wheel, the support means connected with the exhaust means at an interface;

a plurality of spaced mounts provided at said interface on one of the support means and the exhaust means, the mounts having axially opposite faces;

connecting mounts on the other of the support means and the exhaust means and including opposing faces;

wear pads engaging faces of the spaced mounts and the opposing faces of the connecting mounts;

resilient means urging the spaced mounts and connecting mounts together with a force adequate to retain the support means and exhaust means in assembly but limited to allow sliding motion of the wear pads on the opposing faces of the connecting mounts and the spaced mounts;

the wear pads limiting heat transfer from the exhaust means to the support means to prevent high exhaust gas temperatures in the exhaust means from causing excessive operating temperatures in the support means; and supplemental wear pads between the resilient means and the faces of the connecting mounts opposite from those faces engaging the first named wear pads, the supplemental wear pads acting to further limit heat transfer to the support means.

11. A turbocharger having a rotor with an exhaust driven turbine wheel drivingly connected with an intake charge compressor wheel rotatable on a common axis, said turbocharger comprising:

support means rotatably supporting the rotor on the axis with the compressor wheel disposed on a first axial end of the support and the turbine wheel disposed on an opposite second end of the support;

exhaust means for conducting exhaust gas passing through the turbine wheel, the support means connected with the exhaust means at an interface;

a plurality of spaced mounts provided at said interface on one of the support means and the exhaust means, the mounts having axially opposite faces;

connecting mounts on the other of the support means and the exhaust means and including opposing faces;

wear pads engaging faces of the spaced mounts and the opposing faces of the connecting mounts;

resilient means urging the spaced mounts and connecting mounts together with a force adequate to retain the support means and exhaust means in assembly but limited to allow sliding motion of the wear pads on the opposing faces of the connecting mounts and the spaced mounts;

the wear pads limiting heat transfer from the exhaust means to the support means to prevent high exhaust gas temperatures in the exhaust means from causing excessive operating temperatures in the support means; and radial guide means between the support means and the exhaust means and allowing radial expansion and contraction of the exhaust means relative to the support means while maintaining the support and exhaust means in axial alignment.

12. A turbocharger having a rotor with an exhaust driven turbine wheel drivingly connected with an intake charge compressor wheel rotatable on a common axis, said turbocharger comprising:

support means rotatably supporting the rotor on the axis with the compressor wheel disposed on a first axial end of the support and the turbine wheel disposed on an opposite second end of the support;

exhaust means for conducting exhaust gas passing through the turbine wheel, the support means connected with the exhaust means at an interface;

a plurality of spaced mounts provided at said interface on one of the support means and the exhaust means, the mounts having axially opposite faces;

connecting mounts on the other of the support means and the exhaust means and including opposing faces;

wear pads engaging faces of the spaced mounts and the opposing faces of the connecting mounts;

resilient means urging the spaced mounts and connecting mounts together with a force adequate to retain the support means and exhaust means in assembly but limited to allow sliding motion of the wear pads on the opposing faces of the connecting mounts and the spaced mounts;

the wear pads limiting heat transfer from the exhaust means to the support means to prevent high exhaust gas temperatures in the exhaust means from causing excessive operating temperatures in the support means; and centrally disposed clearance openings in the spaced mounts and central guides projecting from the opposing faces of the connecting mounts and extending through the clearance openings of the spaced mounts, the guides aligning the wear pads with the connecting mounts and allowing sliding of the wear pads on the opposite surface of the spaced mounts.

\* \* \* \* \*